(12) United States Patent
Ward

(10) Patent No.: US 7,309,236 B1
(45) Date of Patent: Dec. 18, 2007

(54) APPAREL WITH MERIDIAN PATHWAY MARKINGS

(76) Inventor: John Ward, 123 E. 54th St. - Suite 3H, New York, NY (US) 10022

( * ) Notice: Subject to any disclaimer, the term of this patent is extended or adjusted under 35 U.S.C. 154(b) by 441 days.

(21) Appl. No.: 11/093,468

(22) Filed: Mar. 30, 2005

(51) Int. Cl.
*G09B 23/28* (2006.01)
(52) U.S. Cl. .................................... 434/262
(58) Field of Classification Search ............. 434/219, 434/247, 262, 265, 267, 274, 275; 2/1, 69, 2/115, 158, 159, 161.7
See application file for complete search history.

(56) References Cited

U.S. PATENT DOCUMENTS

| | | | | |
|---|---|---|---|---|
| 4,759,718 A | * | 7/1988 | Nobuta | 434/262 |
| 5,199,876 A | * | 4/1993 | Waldman | 434/262 |
| 5,448,777 A | * | 9/1995 | Lew | 2/161.7 |
| 5,479,661 A | * | 1/1996 | Fingleson et al. | 2/69 |
| 5,779,483 A | * | 7/1998 | Cho | 434/262 |
| 6,258,020 B1 | | 7/2001 | Lopez | |
| 6,471,518 B1 | * | 10/2002 | Beattie | 434/272 |
| 6,763,525 B1 | | 7/2004 | Spector | |
| 6,820,574 B2 | | 11/2004 | Sharpe | |
| 7,244,124 B1 | * | 7/2007 | Merrill | 434/262 |

\* cited by examiner

*Primary Examiner*—Kurt Fernstrom
(74) *Attorney, Agent, or Firm*—Hess Patent Law Firm, PC; Robert J. Hess

(57) ABSTRACT

Apparel on which is printed markings that represent meridian pathways and acupuncture or acupressure regions. The printed markings distinguish in appearance from each other. The apparel may be worn to facilitate instructing, practicing or performing a skill or exercise that relies upon knowing where the meridian pathways and acupuncture or acupressure regions are on the body, but without the need to refer to pictorial diagrams of the human body that have the meridian pathways and/or acupuncture points identified. The skills or exercises include acupressure massage, shiatsu massage, martial arts, dance, acupuncture medicine.

19 Claims, 7 Drawing Sheets

APPAREL WITH MERIDIAN PATHWAY MARKINGS

BACKGROUND OF THE INVENTION

1. Field of the Invention

The present invention relates to apparel on which are printed markings of meridian pathways with acupuncture points. The apparel may be used as an aid in teaching, practicing or performing skills or exercises such as acupressure massage, shiatsu massage, martial arts, dance, and acupuncture medicine.

2. Discussion of the Related Art

Meridian pathways with acupuncture points are well known. There are fourteen primary Meridian pathways, which may be grouped in pairs and are attributed to organs of the body. They are:

Yang Arm: small intestine, triple heater, large intestine
Yin Arm: lung, pericardium, heart
Yang Leg: Urinary Bladder, Gall Bladder, Stomach
Yin Leg: Spleen, Liver, Kidney
Extraordinary: Governing Vessel, Conception vessel The Meridian pathways are typically illustrated in text books or computer graphics showing pictorial diagrams of the human body. The location of acupuncture points are illustrated in the same diagrams.

While these pictorial diagrams with meridian pathways and acupuncture points have been useful to illustrate where they are on the human body, it is still difficult to identify where the meridian pathways and their acupuncture points are located in the absence of the pictorial diagrams. Indeed, practicing some moves in shiatsu massage that call for hand movements that follow along the meridian pathways is cumbersome without such pictorial diagrams handy until one has practiced the moves repetitively for a long time. Acupressure massage requires applying compressive pressure to the body's acupuncture points. Until one practices acupressure massage long enough to know where the acupuncture points are, such pictorial diagrams are needed for accuracy. The same can be said for certain kinds of martial arts training or acupuncture medicine that need to identify acupuncture points on the body.

It would be preferable to readily identify the meridian pathways and/or acupuncture points of the body without the need to look at pictorial diagrams of the human body while instructing, practicing or performing a skill or exercise that requires identifying the meridian pathways and/or acupuncture points of the human body.

BRIEF SUMMARY OF THE INVENTION

One aspect of the invention resides in apparel that has markings of at least portions of meridian pathways and acupuncture or acupressure regions that generally correspond to where they are on the human body when the apparel is worn. The apparel may be a body suit, head coverings, hand coverings and/or foot coverings. The head coverings may be a cap, hat, sweatband or hood. The hand coverings may be gloves or mittens, preferably fingerless or half-fingered or wrist warmers. The foot coverings may be socks, stockings, ankle warmers or footwear that may be digitally printed upon. The printed markings have differences in appearance that distinguish each other, such as color coding and/or different line shapes (e.g., solid or broken) or the shape of the paths themselves including their respective lengths.

Another aspect resides in using such apparel for teaching, practicing or performing skills or exercise that rely upon identifying the meridian pathways and/or acupuncture points. The product may be formed with digital printing techniques to print on fabric and configure the fabric into an apparel item.

BRIEF DESCRIPTION OF THE DRAWINGS

For a better understanding of the present invention, reference is made to the following description and accompanying drawings, wherein like numerals refer to like parts, and the scope of the invention is set forth in the appended claims.

DETAILED DESCRIPTION OF THE INVENTION

Figure 1:
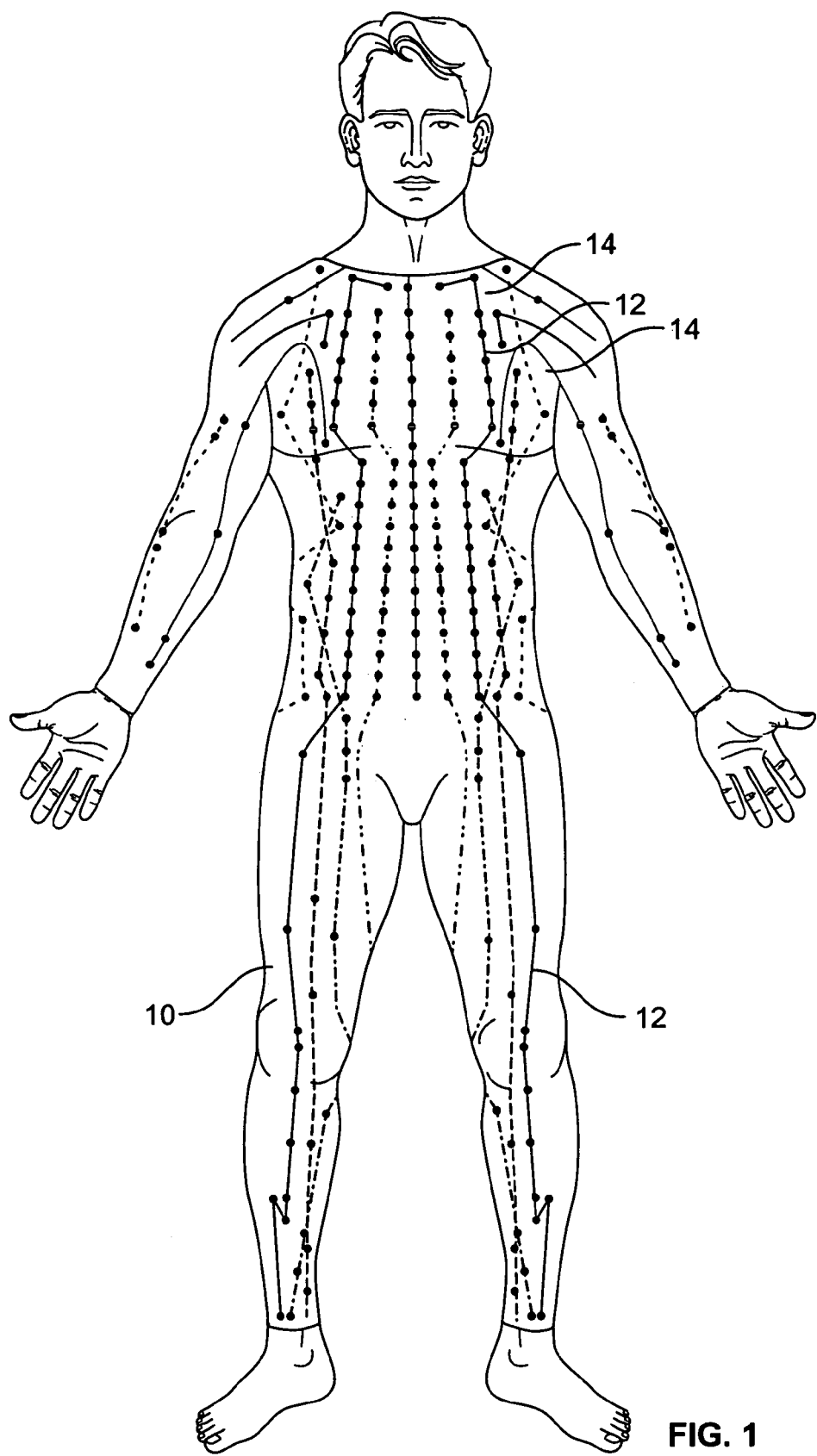
FIG. 1 is a front view of the body suit depicting meridian pathways in accordance with the invention.
Figure 2:
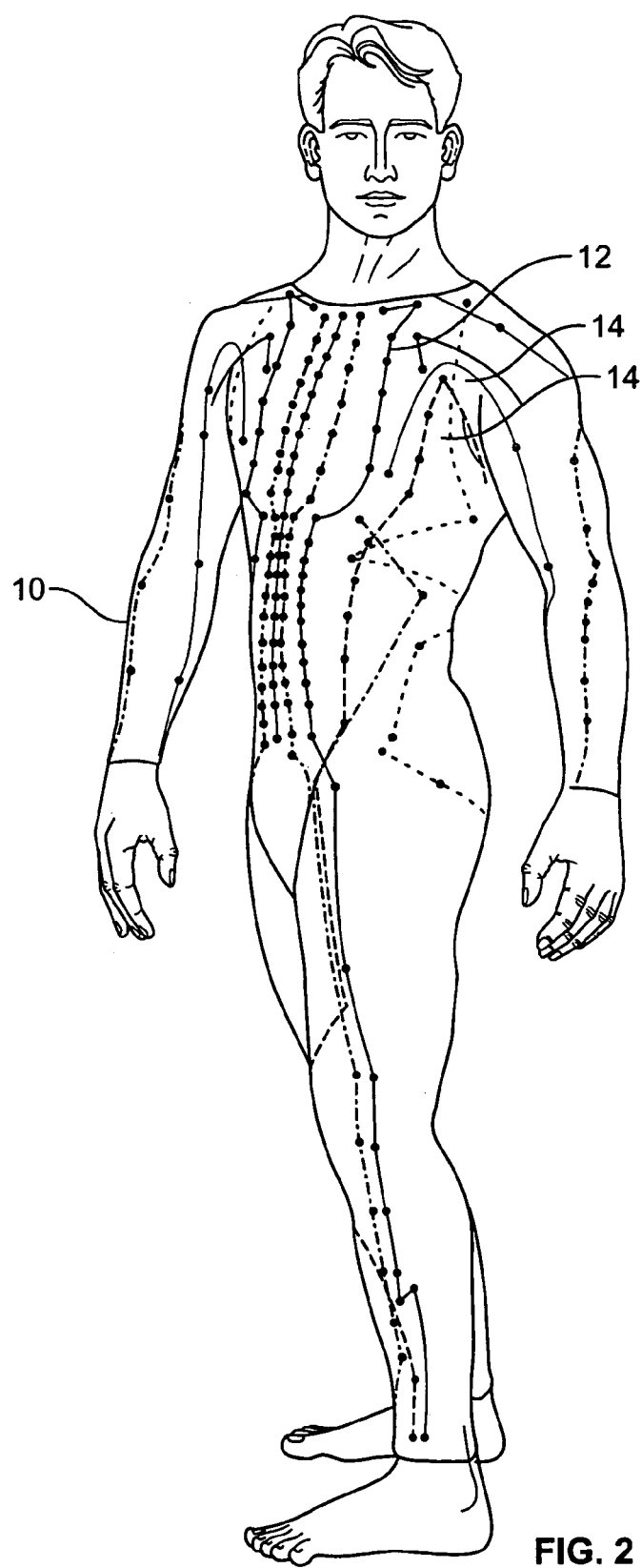
FIG. 2 is a side view.
Figure 3:
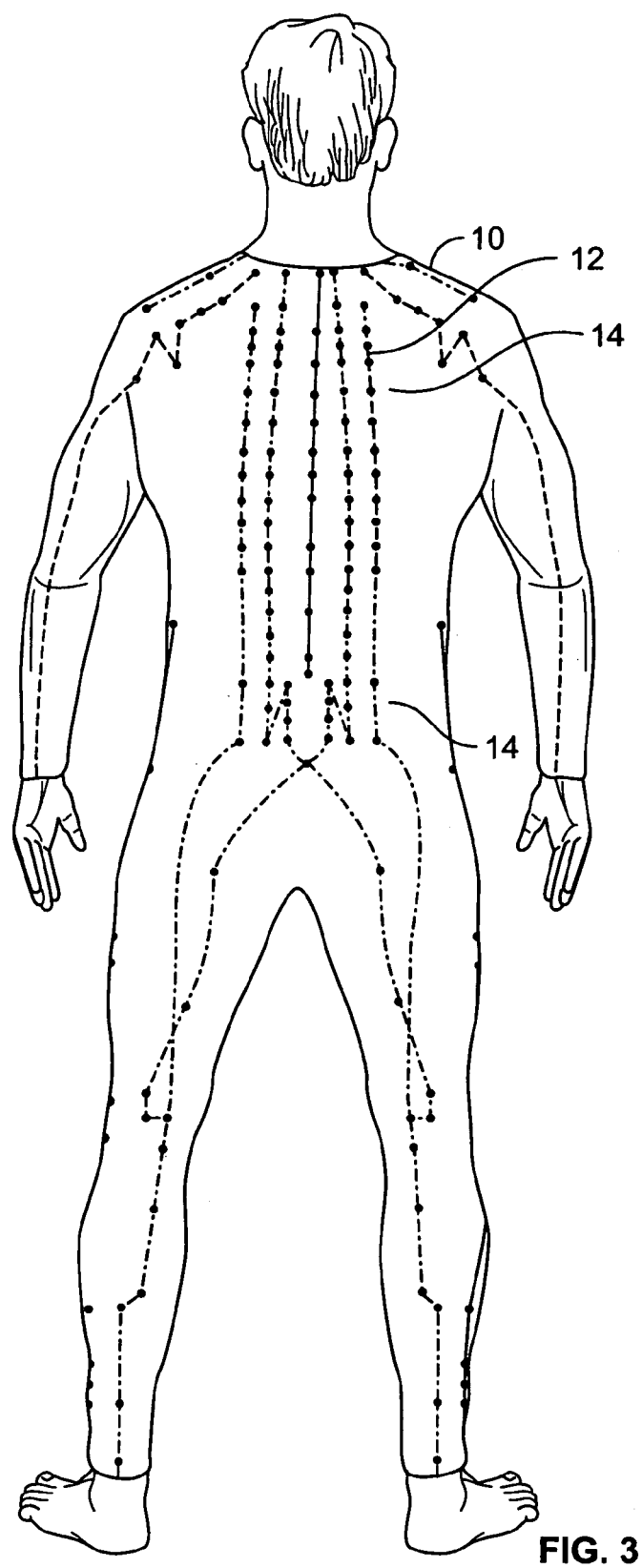
FIG. 3 is a back view.
Figure 4:
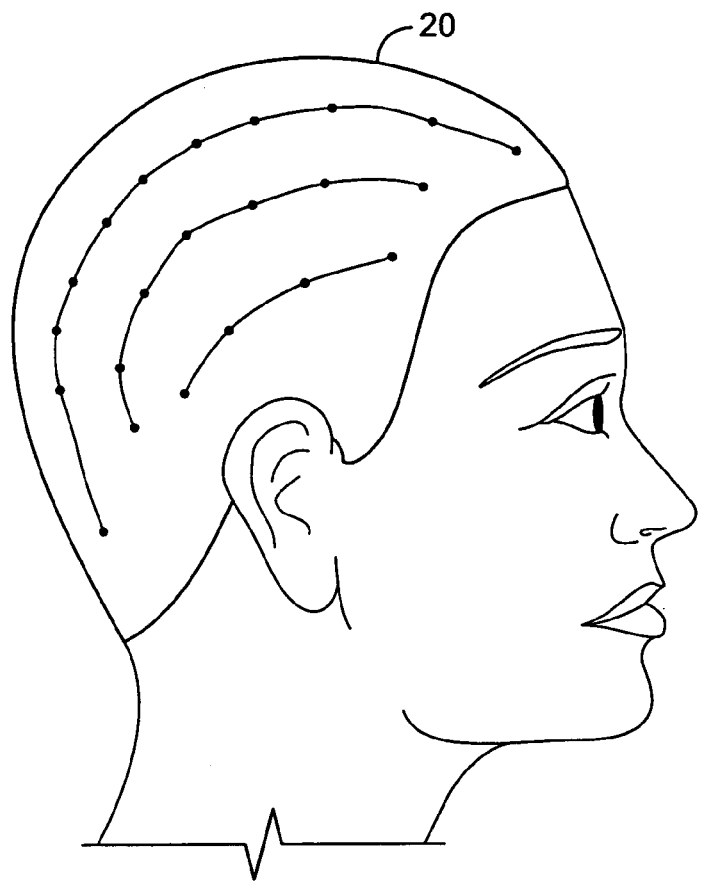
FIG. 4 is a side view of a head covering with printed markings showing approximate locations of meridian pathways. This side view is symmetric to the opposite side view.
Figure 5:
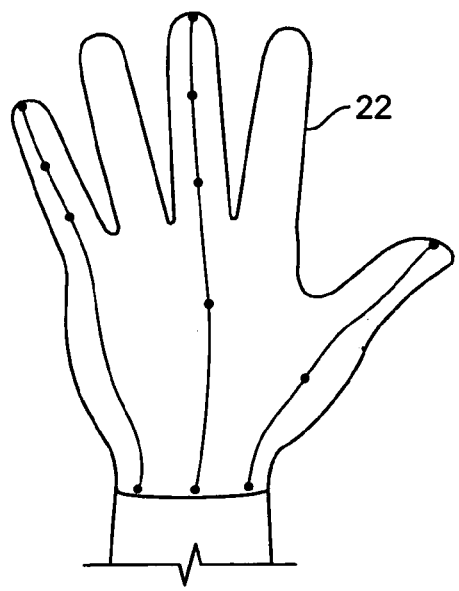
FIGS. 5 and 6 are top views of a left and right hand covering with meridian pathways indicated.
Figure 6:
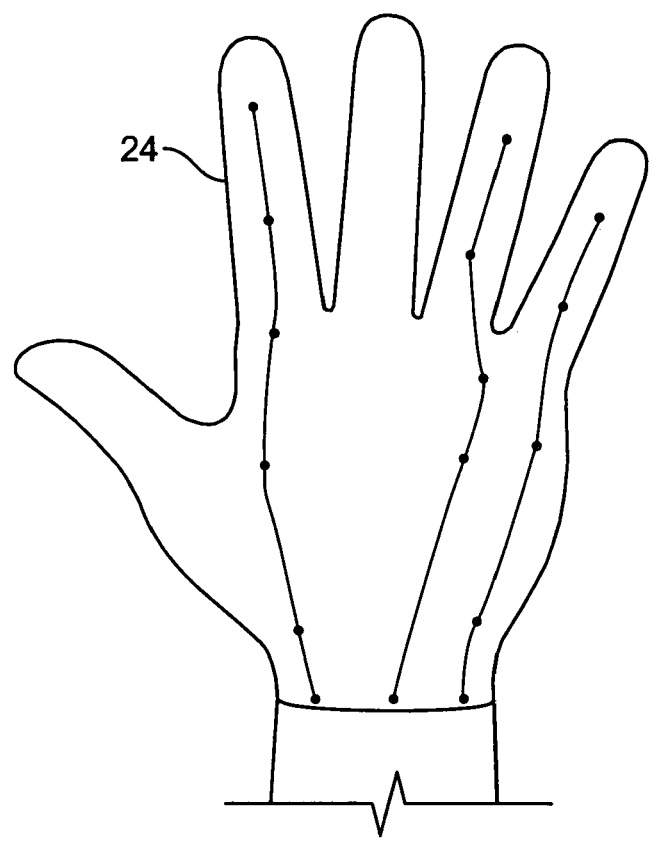

FIGS. 1-3 show a body suit 10. Printed on the exterior of or printed to be visible through the body suit 10 are printed markings that provide designations of approximate locations of the corresponding meridian pathways 12 of the body and a series of corresponding acupuncture regions or acupressure regions 14. The corresponding meridian pathways 12 are represented as lines and may be color coded and/or represented by solid, dashed or other types of broken lines to help distinguish one from the other. The acupuncture regions or acupressure regions 14 are typically known conventionally as acupuncture points or acupressure points.

The printed markings include those that extend on the left side of the body suit 10 symmetrically to those that extend on the right side. Besides placement, the printed markings on the left side differ from each other in appearance—as to relative shape, color and/or line style (broken, solid, etc.). Likewise, the printed markings on the right side differ from each other in appearance in the same manner as for the left side. Such differences are important in enabling ready identification of one meridian pathway from another; one acupuncture or acupressure region from another.

Each corresponding acupuncture or acupressure region may be identified by nomenclature that is unique to that particular acupuncture or acupressure region. For instance, for the meridian pathway of the liver, the letters LV may be assigned to each of the corresponding acupuncture or acupressure regions associated with that pathway and followed by a sequential number unique to that corresponding acupuncture or acupressure region.

Figure 7:
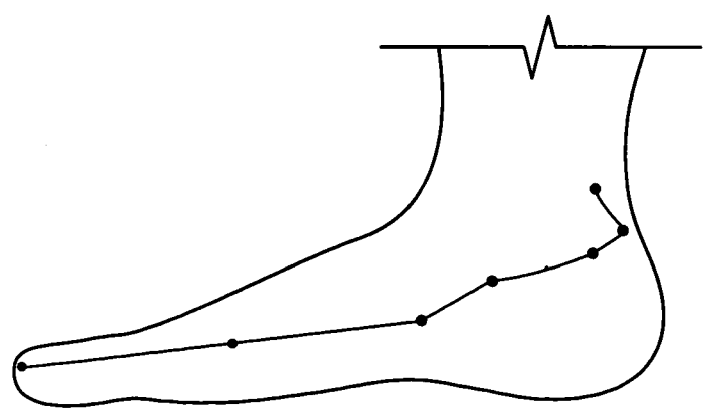
FIG. 7 is a side view of a foot covering with meridian pathways indicated, exemplary for use on the right and left feet.

FIGS. 4-7 show apparel accessories that may be worn with the body suit of FIGS. 1-3 that show the termination 16 of the appropriate ones of the corresponding meridian pathways 12 on the body suit 10 including any corresponding acupuncture or acupressure regions 14. The apparel accessories include a head covering 20 (FIG. 4), left and right hand coverings 22, 24 (FIGS. 5 and 6), and foot covering 26 (FIG. 7).

Figure 8:
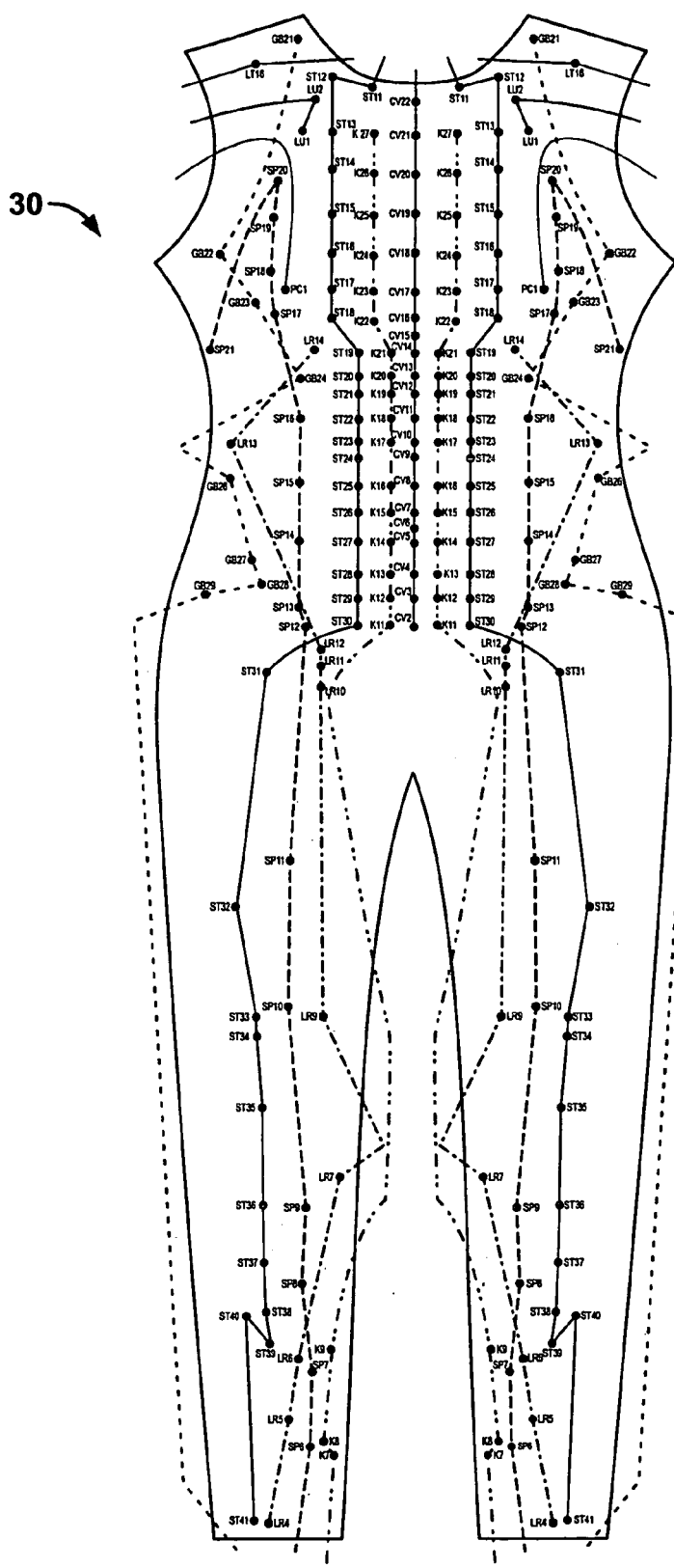
FIG. 8 is a front view of fabric prior to being sewn to form a front of the body suit of FIGS. 1-3 and that has printed markings representing approximate locations of meridian pathways.
Figure 9:
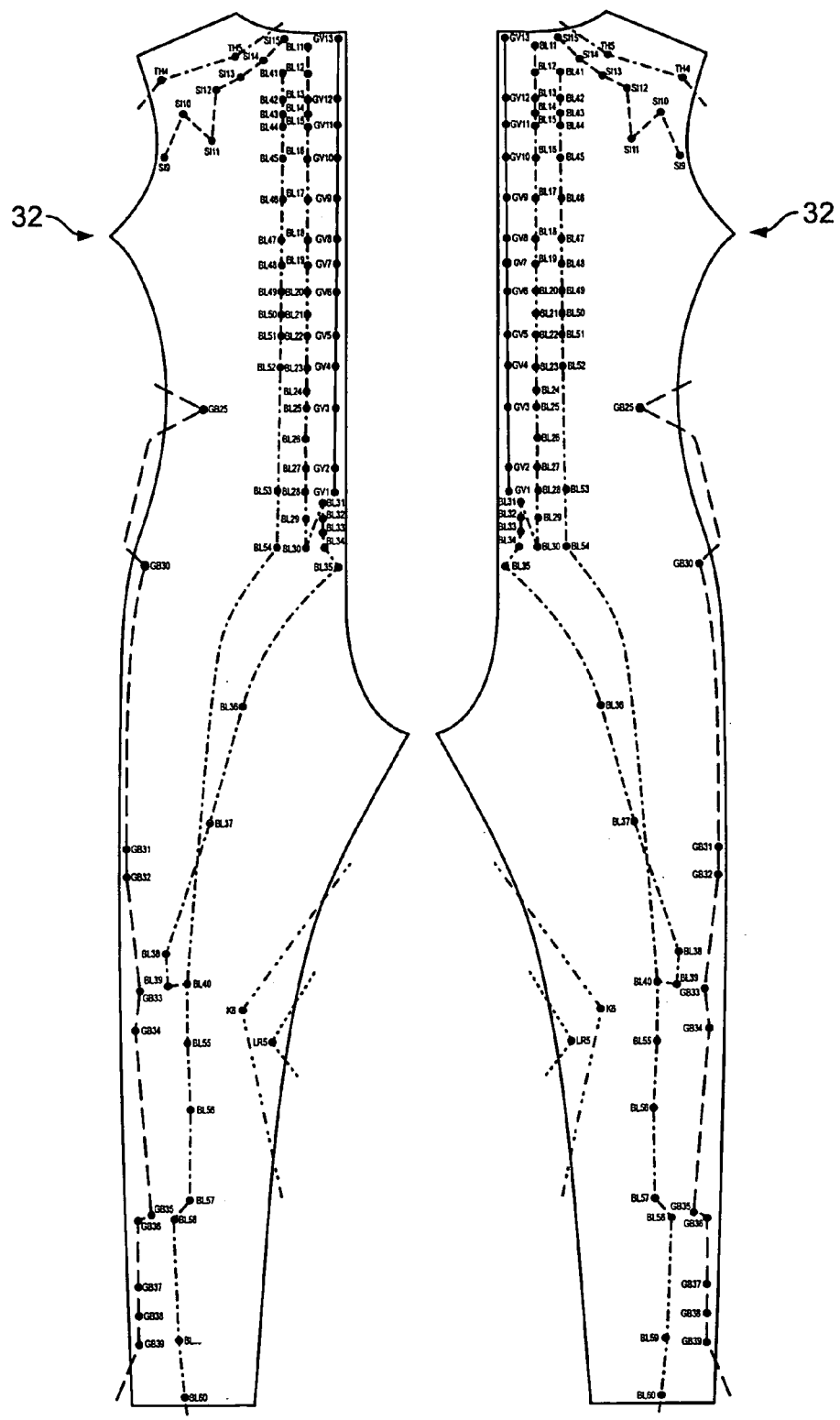
FIG. 9 is a front view of fabric prior to being sewn to form a rear of the body suit of FIGS. 1-3 and that has printed markings representing approximate locations of meridian pathways.

FIGS. 8 and 9 show flat fabric 30, 32 with printed markings that are preferably color coded to correspond to elements that are associated with specific ones of the meridian pathways, e.g., the elements of earth, water, fire, metal, wood. Thus, for instance, the meridian pathway corresponding to water would be blue colored. Examples of suitable color coding for individual ones of the meridian pathways shown in FIGS. 8-9 may be red, yellow, orange, green, purple, blue, brown, pink, gray. The color of the body suit, hand coverings, head covering and foot covering should be a contrasting color to enable ready recognition of the color coded meridian pathway printed markings. The fabric 30, 32 are sewn together at their common edges (other than at the neck, shoulders, and ankle openings) to form a seam for the apparel item. Although not shown in FIGS. 8 and 9, fabric for the arm sleeves is likewise printed upon to form printed markings corresponding to approximate locations of meridian pathways when worn by printing on separate halves of the arm sleeves and sewing the halves together to form seams, except at the shoulder and wrist openings. The shoulder openings are sewn to the shoulders of the body suit of FIGS. 8 and 9. FIGS. 1-3 generally depict the end result.

The head covering 20 (FIG. 4), left and right hand coverings 22, 24 (FIGS. 5 and 6), and foot covering 26 (FIG. 7) are made in a similar manner, with two halves that are printed upon and then sewn together along their common edges. The head covering 20 is configured to fit snugly on the scalp. The left and right hand coverings 22, 24 are configured to fit snugly on the left and right hands as applicable. The foot covering 26 is configured to fit snugly on the left or right foot as applicable.

When worn, the apparel of FIGS. 1-6 help one to visualize generally where each meridian pathway is located along the body and where the associated acupuncture or acupressure regions lie. This allows one to teach, practice or perform skills or exercises that rely upon the location of such meridian pathways and/or acupuncture or acupressure regions. Such skills or exercises include acupressure massage, acupuncture medicine, shiatsu massage, certain QiKung forms of martial arts that apply pressure to acupuncture points, and dance that require hand or foot movements to follow the body's meridian pathways. Some hand movements in shiatsu massage call for rubbing one's thumb along a meridian pathway.

If desired, the corresponding meridian pathways may be printed with any conventional digital printing technique that digitally prints onto fabric or textiles. Such techniques are controlled by a conventional computer program for effecting the digital printing. The computer program requires certain entries—color selection, line style selection, and the pattern to be printed. The pattern is defined by the relative locations of the meridian pathways and acupuncture or acupressure regions on the apparel that correspond generally (when the apparel is worn) to where the meridian pathways and acupuncture points are along the human body.

The ink for printing may be any desired colors or may be fluorescent. With fluorescent colors, the corresponding meridian pathway lines glow in the dark, which may enhance the aesthetic appeal of performing the skills or exercise in the dark. Printing techniques other than digital printing, such as transfer printing, may be used.

The body suit and head and appendage accessories may be made of a stretch cotton or spandex material that is elastic to fit snug or cling to the body, head or appendage which keeps the designations of the meridian pathways remaining at the same relative position along the body while the apparel item is being worn. Spandex is a long-chain synthetic polymeric fiber.

Preferably, the accessories, namely, the head covering 20, hand covering 22, 24 and foot covering 26 (FIGS. 4-7) have corresponding meridian pathways printed on the outside of the applicable accessory or printed to be visible through the applicable accessory in a manner the same as for the body suit 10 to align with associated ones of the corresponding meridian pathways 12 visible on the body suit 10. Thus, the applicable meridian pathways appear to terminate on the accessories.

Although the above describes particular embodiments of the invention, many other variations and modifications and other uses may become apparent to those skilled in the art. It is preferred, that the present invention not be limited by this specific disclosure herein, but only by the appended claims.

What is claimed is:

1. A product that provides designations of meridian pathways of a human being, comprising an apparel item formed of an elastic fabric material that fits snug or clings to a wearer's body while worn; and printed markings on the apparel item that are configured and arranged to provide designations of approximate locations along the wearer's body of meridian pathways and of acupuncture regions or acupressure regions along the meridian pathways, the printed markings including those that extend along a left side of the apparel item that are symmetric with those that extend along a right side of the apparel item, the printed markings on the left side having differences in appearance from each other, the printed markings on the right side likewise having differences in appearance from each other.

2. A product of claim 1, wherein the printed markings include printed lines representing the designations of approximate locations of the meridian pathways.

3. A product of claim 2, wherein the printed markings include color coding of the printed lines as the differences in appearance to distinguish the printed lines that represent different ones of the meridian pathways from each other.

4. A product of claim 2, wherein the printed lines include broken lines and solid lines as the differences in appearance that distinguish the printed lines that represent different ones of the meridian pathways from each other.

5. A product of claim 1, wherein the apparel item is selected from a group consisting of a body suit, head covering, hand covering and foot covering.

6. A product of claim 1, further comprising printed nomenclature indicative of the acupuncture regions or acupressure regions, the printed nomenclature being adjacent corresponding ones of the acupuncture regions or acupressure regions.

7. A product of claim 1, wherein the elastic fabric material from which the apparel item is formed is spandex or stretch cotton.

8. A method of providing designations of meridian pathways of a human being, comprising:
wearing an apparel item that fits snug or clings to a wearer's body, the apparel item being made of an elastic fabric material;

providing, with printed markings on the apparel item, designations of approximate locations along the wearer's body of meridian pathways and of acupuncture regions or acupressure regions along the meridian pathways, the printed markings including those that extend along a left side of the apparel item that are symmetric with those that extend along a right side of the apparel item, the printed markings on the left side having differences in appearance from each other, the printed markings on the right side likewise having differences in appearance from each other.

9. A method of claim 8, wherein the designations aid in performing a skill or exercise.

10. A method of claim 9, wherein the designations aid practicing or teaching the skill or exercise as part of the performing.

11. A method of claim 9, wherein the skill or exercise is selected from a group consisting of QiKung, acupressure massage, shiatsu massage, martial arts, acupuncture medicine, dance.

12. A method of forming a product that represents meridian pathways of a human being, comprising
forming an apparel item from an elastic fabric material to fit snug or cling to a wearer's body; and
providing, with printed markings on the apparel item, designations of approximate locations of meridian pathways and acupuncture regions or acupressure regions along the meridian pathways, the printed markings including those that extend along a left side of the apparel item that are symmetric with those that extend along a right side of the apparel item, the printed markings on the left side having differences in appearance from each other, the printed markings on the right side likewise having differences in appearance from each other.

13. A method of claim 12, wherein the providing includes providing printed lines as the printed markings to represent the designations of the approximate locations of the meridian pathways, the printed lines having the differences in appearance that distinguish the printed lines that represent different ones of the meridian pathways from each other.

14. A method of claim 12, wherein the providing includes color coding the printed markings to provide the differences in appearance to distinguish the printed lines that represent different ones of the meridian pathways from each other.

15. A method of claim 13, wherein the providing printed lines with broken lines and solid lines to provide the differences in appearance to distinguish the printed lines that represent different ones of the meridian pathways from each other.

16. A method of claim 12, wherein the apparel item is selected from a group consisting of a body suit, head covering, hand covering and foot covering.

17. A method of claim 12, further comprising applying printed nomenclature indicative of the acupuncture regions or acupressure regions, the printed nomenclature being adjacent corresponding ones of the acupuncture regions or acupressure regions.

18. A method of claim 12, wherein the elastic fabric material from which the apparel item is formed is spandex or stretch cotton.

19. A method of claim 12, wherein the forming includes sewing edges of two complementary fabric portions together to form the apparel item and, prior to the sewing, printing the printed markings on surfaces of the two complementary fabric portions.

\* \* \* \* \*